(12) United States Patent
Ramsauer et al.

(10) Patent No.: US 11,764,563 B2
(45) Date of Patent: Sep. 19, 2023

(54) VEHICLE ELECTRICAL SYSTEM, PARTICULARLY FOR A MOTOR VEHICLE

(71) Applicant: CONTINENTAL AUTOMOTIVE GMBH, Hannover (DE)

(72) Inventors: Ludwig Ramsauer, Munich (DE); Rainer Knorr, Munich (DE); Stephanie Preisler, Munich (DE); Dirk Reichow, Munich (DE)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 17/731,980

(22) Filed: Apr. 28, 2022

(65) Prior Publication Data

US 2022/0352705 A1 Nov. 3, 2022

(30) Foreign Application Priority Data

Apr. 29, 2021 (DE) ..................... 10 2021 111 027.0

(51) Int. Cl.
*H02H 3/00* (2006.01)
*B60L 3/00* (2019.01)
*B60R 16/023* (2006.01)
*H02H 1/00* (2006.01)
*H02H 9/04* (2006.01)

(52) U.S. Cl.
CPC ............ *H02H 3/00* (2013.01); *B60L 3/0023* (2013.01); *B60R 16/0232* (2013.01); *H02H 1/0007* (2013.01); *H02H 9/04* (2013.01)

(58) Field of Classification Search
None
See application file for complete search history.

(56) References Cited

U.S. PATENT DOCUMENTS

| 6,437,957 | B1* | 8/2002 | Karuppana | ............ H02H 3/087 |
| | | | | 361/78 |
| 10,283,972 | B2* | 5/2019 | Tsai | .......................... H03K 5/04 |
| 2015/0015063 | A1* | 1/2015 | Bissontz | ................. B60L 3/108 |
| | | | | 307/9.1 |
| 2020/0262297 | A1* | 8/2020 | Kubota | .................. B60L 3/0069 |
| 2021/0344187 | A1* | 11/2021 | Namuduri | ............ H02H 3/0935 |

* cited by examiner

*Primary Examiner* — Stephen W Jackson
(74) *Attorney, Agent, or Firm* — Pauley Erickson & Swanson

(57) ABSTRACT

A vehicle electrical system, particularly for a motor vehicle. The vehicle electrical system has at least two electrical system branches, a disconnecting switch device between the two electrical system branches, wherein the disconnecting switch device has a first controllable switch unit and a series circuit having a second controllable switch unit and an overcurrent protection unit, wherein the first switch unit and the series circuit are electrically connected to each other in parallel between the two electrical system branches, and a control unit which in an idle mode of the vehicle electrical system, is equipped to switch the first switch unit into an open, current-disconnecting switching state and to keep it in the current-disconnecting switching state and to switch the second switch unit into a closed, current-carrying switching state and to keep it in this current-carrying switching state. A motor vehicle with the above-mentioned vehicle electrical system is also disclosed.

20 Claims, 1 Drawing Sheet

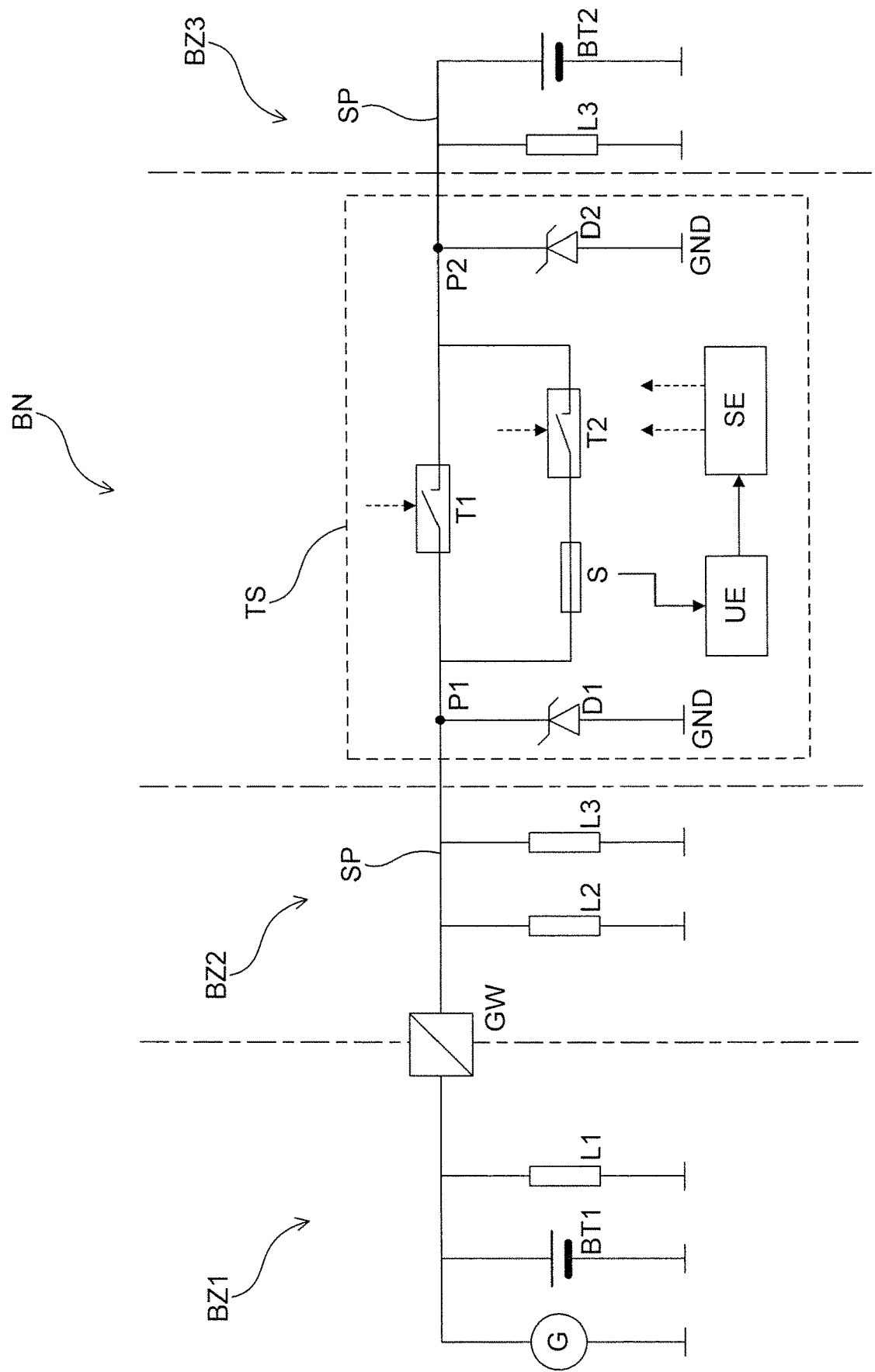

VEHICLE ELECTRICAL SYSTEM, PARTICULARLY FOR A MOTOR VEHICLE

CROSS REFERENCE TO RELATED APPLICATION

German Patent Reference DE 10 2021 111 027.0, filed 29 Apr. 2021, the priority document corresponding to this invention, to which a foreign priority benefit is claimed under Title 35, United States Code, Section 119, and its entire teachings are incorporated, by reference, into this specification.

BACKGROUND OF THE INVENTION

Field of the Invention

This invention relates to a vehicle electrical system, particularly for a motor vehicle, especially for an electrically driven motor vehicle.

Discussion of Related Art

Vehicle electrical systems for technical apparatuses, particularly for motor vehicles, especially electrically driven vehicles, have two or more electrical system branches in which different electrical devices, which should be supplied with power independently of one another, for example for safety-relevant reasons, are electrically connected separately from one another, and thus supplied with power separately from the respective electrical system branches. As a rule, disconnecting switch devices are provided between these electrical system branches, which electrically disconnect the electrical system branches from each other as needed, for example in the event of a malfunction in one of the electrical system branches. As with all safety-relevant components of technical apparatuses such as vehicle components, vehicle electrical systems must meet strict requirements with regard to reliability.

SUMMARY OF THE INVENTION

One object of this invention is to provide a more reliable vehicle electrical system of a technical apparatus, particularly of a motor vehicle, especially of an electrically driven motor vehicle.

This object and others are attained by the description in the claims, including the dependent claims.

According to one embodiment of this invention, a vehicle electrical system is provided for a technical apparatus, particularly for a motor vehicle, especially for an electrically driven vehicle.

The vehicle electrical system has at least two electrical system branches, which are electrically connected to each other via a positive voltage-side current path and each have at least one, in particular safety-relevant, electrical device.

The vehicle electrical system also has at least one disconnecting switch device. The disconnecting switch device is electrically connected in the positive voltage-side current path between the two electrical system branches. In this case, in the event of a critical state in one of the two electrical system branches, the disconnecting switch device is equipped to interrupt a current flow via the current path and thus to electrically isolate the two electrical system branches from each other. To accomplish this, the disconnecting switch device has a first controllable switch unit and a series circuit including a second controllable switch unit and an overcurrent protection unit. In this case, the first switch unit and the series circuit are electrically connected to each other in parallel in the current path between the two electrical system branches.

The disconnecting switch device also has a control unit for actuating the disconnecting switch device, which is connected in a signal-carrying way on its control signal output side to the first and second switch units or more precisely to their respective control signal input connections. In an idle mode or in a low-power mode of the vehicle electrical system in which the technical apparatus is not in operation, or the vehicle is parked and is thus not in the driving mode, the control unit is equipped to switch the first switch unit into an open, current-disconnecting switching state and to keep it in this current-disconnecting switching state and at the same time, to switch the second switch unit into a closed, current-carrying switching state and to keep it in this current-carrying switching state. In the idle mode and in the event of an overcurrent in the series circuit, the overcurrent protection unit is also equipped to interrupt the current flow via the series circuit.

The above-described vehicle electrical system, having at least two electrical system branches that are electrically connected to each other via the disconnecting switch device, insures a redundant and mutually independent power supply to various electrical devices with different power requirements and different sensitivities to voltage/current fluctuations in the vehicle electrical system, such as actuators and controllers, and enables a reliable performance of particularly safety-relevant functions of the technical apparatus or performance of particularly safety-relevant vehicle functions such as the automated driving of vehicles.

In the event of a malfunction in one of the two electrical system branches, the disconnecting switch device insures a reliable power supply in the other malfunction-free electrical system branch and thus enables a mutually independent power supply to the two electrical system branches. It is thus not necessary to provide a galvanic isolation of the two electrical system branches or even to provide a dual vehicle electrical system design with two vehicle electrical systems that are electrically isolated from each other in a technical apparatus or in a vehicle.

In this case, the reliable power supply is accomplished by the disconnecting switch device, which controls the current flow between the two electrical system branches by its first controllable switch unit, a main switch unit or "main disconnector" and its series circuit with a second controllable switch unit, an auxiliary switch unit or "bypass disconnector" in the operating mode and in the idle mode of the vehicle electrical system.

Because in the idle or low-power mode of the vehicle electrical system, the disconnecting switch device uses the control unit to switch the first switch unit or the main switch unit, whose task is chiefly to transmit power between the two electrical system branches in the operating mode of the vehicle electrical system, into an open, current-disconnecting switching state and to keep it in this current-disconnecting switching state, the disconnecting switch device insures that an excessive quantity of current is not transmitted between the two electrical system branches in the idle mode. At the same time, in the idle mode, the disconnecting switch device uses the control unit to switch the second switch unit or the auxiliary switch unit into a closed, current-carrying switching state and to keep the second switch unit in this current-carrying switching state. This insures a low current flow between the two electrical system branches in order to supply power for, in particular safety-relevant, functions such as the function "ignition off" or "key of" in a vehicle.

In the idle mode, the overcurrent protection unit insures, passively and without additional power consumption without this consuming additional power, that the second switch unit and thus also the disconnecting switch device does not depart from its "safe operating area (SOA) in an uncontrolled way, which, in a subsequent transition from the idle mode into the operating mode, would result in the state of the disconnecting switch device remaining undiagnosable and consequently, in a reliable function of the disconnecting switch device in the operating mode being no longer guaranteed.

To achieve this, the overcurrent protection unit interrupts the current flow via the series circuit and thus via the second switch unit at the moment that a critical overcurrent such as a short-circuit current flows through the series circuit in the idle mode, thus protecting the second switch unit from damage due to the overcurrent, and insuring that the second switch unit and thus the disconnecting switch device also does not depart from its safe operating area in an uncontrolled way.

In addition, the overcurrent protection unit provides the possibility, in a transition from an idle mode into a subsequent operating mode, of reliably diagnosing the state of the disconnecting switch device. To accomplish this, it is only necessary, for example, to diagnose the state of the overcurrent protection unit, wherein based on the diagnosed state, reliable information can be acquired as to the state of the disconnecting switch device.

As a result, the disconnecting switch device can be diagnosed at any time and is thus also able to detect damage to itself due to an overcurrent in the vehicle electrical system, particularly in the idle mode of the vehicle electrical system, and to prevent consequential damage to itself and to the vehicle electrical system.

This makes it possible to create a more reliable vehicle electrical system of a technical apparatus, particularly of a motor vehicle, especially of an electrically driven motor vehicle.

The vehicle electrical system can be used in motor vehicles, particularly in electrically driven motor vehicles, and also in supplying electric power to other electrical apparatuses such as aircraft in higher voltage ranges.

For example, in an operating mode, or "high-power mode", of the vehicle electrical system in which the technical apparatus is in operation or the vehicle is in driving mode, the control unit is also equipped to switch the first switch unit into a closed, current-carrying switching state and to keep it in the current-carrying switching state, and to switch the second switch unit into an open, current-disconnecting switching state and to keep it in this current-disconnecting switching state.

For example, the disconnecting switch device also has a monitoring unit for monitoring the state of the overcurrent protection unit. The monitoring unit is connected in a signal-carrying way on its signal output side to a signal input of the control unit. In the event that the overcurrent protection unit has a malfunction or is defective and therefore loses or has lost its protective function, the monitoring unit is equipped to output a state-warning signal in order to prompt the control unit, in a transition from the idle mode into the operating mode of the vehicle electrical system, to keep the first switch unit in the open current-disconnecting switching state, or to switch it into the open current-disconnecting switching state and keep it in this open switching state, and thus to interrupt a current flow between the two electrical system branches via the first switch unit. In addition, the monitoring unit is preferably equipped to output the state-warning signal in order to also prompt the control unit, in the transition from the idle mode into the operating mode, to also keep the second switch unit in the open current-disconnecting switching state, or to switch it into the open current-disconnecting switching state and keep it in this open switching state, and thus to interrupt a current flow between the two electrical system branches also via the second switch unit and therefore via the entire disconnecting switch device.

In a transition from an idle mode into a subsequent operating mode, the monitoring unit determines whether the disconnecting switch device is still intact and whether the disconnecting switch device is still in the safe operating area. With the monitoring unit, it is thus possible to diagnose the disconnecting switch device at any time. In addition, the monitoring unit, with its state diagnosis in the disconnecting switch device, insures a safe transition of the vehicle electrical system from an idle mode into a subsequent operating mode and thus protects the vehicle electrical system or at least a still-intact electrical system branch from consequential damage due to an overcurrent that has occurred in another of the two electrical system branches during the idle mode.

The state diagnosis in the disconnecting switch device with the monitoring unit requires no additional power supply during the idle mode.

The isolating circuit thus combines a reliable protection of the isolating circuit itself and of the vehicle electrical system from consequential damage due to an overcurrent in one of the electrical system branches during an idle mode of the vehicle electrical system and a reliable diagnosis of irregularities and critical states in the isolating circuit itself and in the vehicle electrical system when exiting the idle mode without the isolating circuit departing from its safe operating area in an uncontrolled way and also remaining undiagnosable.

For example, the overcurrent protection unit has a melting fuse. In the event of an overcurrent or short-circuit current in the series circuit, the melting fuse melts and thus interrupts the current flow through the series circuit. As a result, the overcurrent protection unit loses its protective function. This event or more precisely, the loss of the protective function of the overcurrent protection unit cannot be easily diagnosed with the monitoring unit.

Instead of the melting fuse, it is also possible for an overcurrent protection unit, embodied in the form of an electronic or mechanical circuit such as a pyrotechnic fuse, a pyrotechnic isolating circuit or a pyrotechnic isolating element, or in the form of a deliberate tapering of a conductor path of the series circuit through which the current flow of the series circuit takes place, to be used, which performs the same function as the melting fuse.

In the case of the pyrotechnic fuse, when an overcurrent or a short-circuit current occurs in the series circuit, the fuse or a part of it is blown apart, automatically due to the high energy of the overcurrent, for example by small integrated propellant charges. The current connection via the series circuit and thus also the current flow through the series circuit is thus safely interrupted.

In the case of the deliberate tapering of a conductor path of the series circuit, the overcurrent protection unit is constituted by a tapered segment of a conductor path that produces the current connection of the series circuit. Because of the tapering, the segment has a comparatively small cross-sectional area and a comparatively high ohmic resistance compared to the rest of the conductor path. In the event of an overcurrent or short-circuit current, because of the high resistance, a heating effect occurs in the tapered segment, which causes it to melt or burn through like a melting fuse and thus to interrupt the current flow through the series circuit.

In the event of irregularities or in critical states in the isolating circuit or in the electrical system branches, it is thus reliably possible to electrically isolate the electrical system branches from each other and to safely prevent an undesirable current flow between the electrical system branches.

For example, the first and/or second switch unit each has a disconnecting switch, for example in the form of a MOSFET switch.

For example, the disconnecting switch device also has a first overvoltage protection unit, which is electrically connected between a first current connection point, which lies on the current path and between a first of the two electrical system branches and the disconnecting switch device, and electrical ground and is equipped to protect the disconnecting switch device from overvoltages in the first electrical system branch. Alternatively or in addition to the first overvoltage protection unit, the disconnecting switch device also has, for example, a second overvoltage protection unit, which is electrically connected between a second current connection point, which lies on the current path and between a second of the two electrical system branches and the disconnecting switch device, and an electrical ground and is equipped to protect the disconnecting switch device from overvoltages in the second electrical system branch.

For example, the first overvoltage protection unit has a first unidirectional suppression diode or "transient voltage suppression diode (TVS diode)", which is electrically connected between the first current connection point and the ground. In this connection, the first suppression diode is connected in such a way that its reverse direction points from the first current connection point to the ground. Analogously, the second overvoltage protection unit has, for example, a second unidirectional suppression diode, which is electrically connected between the second current connection point and the ground. Analogously to the first overvoltage protection unit, the second suppression diode is connected in such a way that its reverse direction points from the second current connection point to the ground.

For example, the first suppression diode and/or the second suppression diode each have a breakdown voltage that lies below a critical or transient overvoltage that can cause a malfunction in the disconnecting switch device and can cause the disconnecting switch device to depart from its safe operating area, in an uncontrollable way. In other words, the respective voltage levels of the suppression diodes are selected so that the suppression diodes limit (transient) overvoltages in the two electrical system branches to (far) below a voltage level that would interfere with or even damage the disconnecting switch device, in particular its switch units.

The two suppression diodes discharge (transient) overvoltage spikes in the respective electrical system branches and thus prevent overvoltage spikes from causing the disconnecting switch device, in particular its two switch units, to prematurely depart from its safe operating area and thus lose its protective function. As a result, the two suppression diodes effectively protect the disconnecting switch device and thus also the vehicle electrical system from malfunctions due to (transient) overvoltages.

When they reach their respective breakdown voltages, the two suppression diodes become conductive and thus limit the overvoltage to the level of the respective breakdown voltages. The voltage levels of the two suppression diodes are thus selected so that the two switch units or more precisely, the two disconnecting switches never depart from their safe operating areas due to an overvoltage. A power supply for the two diodes is not required.

Alternatively to the suppression diodes, semiconductor circuits such as clamping circuits can be used as overvoltage protection units, which provide the same function.

According to another embodiment of this invention, a motor vehicle, especially an electrically driven vehicle, is provided with an above-described vehicle electrical system.

BRIEF DESCRIPTION OF THE DRAWING

An exemplary embodiment of this invention will be explained in greater detail below with reference to the accompanying drawing in which a schematic circuit topology, the FIGURE shows a vehicle electrical system BN of an electrically drivable, partially or fully automated motor vehicle with three electrical system branches or vehicle electrical system segments BZ1, BZ2, BZ3, which are schematically shown in the drawing and are separated from one another by dashed lines.

DETAILED DESCRIPTION OF THE INVENTION

A first electrical system branch BZ1 has an electrical system nominal voltage of 48 volts or higher, for example 400 volts. High-powered or high-voltage components such as a traction battery BT1, a starter-generator G, and an electric heater L1 are electrically connected in the first electrical system branch BZ1. The first electrical system branch BZ1 is electrically connected to the second and third electrical system branches BZ2, BZ3 via a DC voltage converter GW.

In this case, the electrical system branch BZ1 is an optional component of the vehicle electrical system BN. The vehicle electrical system BN can have only the second and third electrical system branches BZ2, BZ3. In this case, one of the two electrical system branches BZ2, BZ3 can have an energy storage device such as a 12 volt battery BT2 as a power source.

A second and third electrical system branch BZ2, BZ3 have the same electrical system nominal voltage, for example 12 volts or much lower than 48 volts. Both high-powered components such as a headlight L2 and safety-relevant components such as components of a driving safety system L3 are electrically connected in the second electrical system branch BZ2. In addition to safety-relevant components such as components of a driving safety system L3, an energy storage device such as a low-voltage battery is also electrically connected in the third electrical system branch BZ3. In this case, the safety-relevant components L3 can be implemented redundantly and can be respectively positioned in distributed fashion in the second and third electrical system branches BZ2, BZ3.

The vehicle electrical system BN also optionally has a galvanically isolated or semi-galvanically isolated, preferably bidirectional DC voltage converter of a known type, which is electrically connected between the first and second electrical system branches BZ1, BZ2 and is equipped to convert between the different voltage levels of the nominal voltages of the two electrical system branches BZ1, BZ2 and thus to establish a preferably bidirectional current flow between these two electrical system branches BZ1, BZ2.

The vehicle electrical system BN also has a disconnecting switch device TS for protecting the second or third electrical system branch BZ2, BZ3 from mal functions in the respective other of the two electrical system branches BZ2, BZ3.

The disconnecting switch device TS is electrically connected between the second and third electrical system branch BZ2 and BZ3 or more specifically in a positive voltage-side current path SP between these two electrical system branches BZ2, BZ3. In the event of a critical state in one of the two electrical system branches BZ2, BZ3, the disconnecting switch device TS is equipped to electrically disconnect the two electrical system branches BZ2, BZ3 from each other and thus to interrupt a current flow between the two electrical system branches BZ2, BZ3 via the current path SP. Correspondingly, in non-critical, normal operating states in the two electrical system branches BZ2, BZ3, the disconnecting switch device TS is also equipped to electrically connect the two electrical system branches BZ2, BZ3 to each other and thus to enable a current flow between the two electrical system branches BZ2, BZ3 via the current path SP.

For this purpose, the disconnecting switch device TS has a first controllable switch unit T1 and a series circuit including a second controllable switch unit T2 and an overcurrent protection unit S. In this case, the first switch unit and the series circuit are electrically connected to each other in parallel in the current path SP. The first switch unit T1 has a first controllable disconnecting switch or is embodied as a first disconnecting switch, which includes for example of a MOSFET. The second switch unit T2 has a second controllable disconnecting switch or is embodied as a second disconnecting switch, which includes for example of another MOSFET. The overcurrent protection unit S has a melting fuse, which is electrically connected in series to the second disconnecting switch T2.

The disconnecting switch device TS also has a control unit SE with two (logical) control signal outputs and, via its control signal outputs, is connected in a signal-carrying way on its control signal output side to the first and second switch unit or more precisely, to control signal inputs of the respective disconnecting switches T1, T2 and is equipped to actuate the disconnecting switch device TS or more precisely, the two disconnecting switches T1, T2.

The disconnecting switch device TS also has a monitoring unit UE with a signal output, which is connected in a signal-carrying way on its signal output side via its signal output to a signal input of the control unit SE and is equipped to monitor the state of the overcurrent protection unit or of the melting fuse S in a way known to the person skilled in the art, for example by measuring a voltage that drops through the melting fuse S, and in accordance with the state of the melting fuse S, by outputting a signal to the control unit SE to prompt it to make or break the current flow via the current path SP between the two electrical system branches BZ2, BZ3.

The disconnecting switch device TS also has a first overvoltage protection unit for example with a first unidirectional suppression diode D1, which is electrically connected between a first current connection point P1, which lies on the current path SP and between the second electrical system branch BZ2 and the disconnecting switch device TS, and electrical ground GND. In this case, the reverse direction of the first suppression diode D1 points from the first current connection point P1 to ground GND. The first overvoltage protection unit or more precisely the first suppression diode D1 is equipped to protect the disconnecting switch device TS, in particular its disconnecting switches T1, T2, and the circuit components, in particular the safety-relevant electrical devices L2, L3 in the second electrical system branch BZ2, from (transient) overvoltages in the second electrical system branch BZ2.

Analogously, the disconnecting switch device TS also has a second overvoltage protection unit for example with a second unidirectional suppression diode D2, which is electrically connected between a second current connection point P2, which lies on the current path SP and between the third electrical system branch BZ3 and the disconnecting switch device TS, and electrical ground GND. In this case, the reverse direction of the second suppression diode D2 points from the second current connection point P2 to ground GND. The second overvoltage protection unit or more precisely the second suppression diode D2, analogous to the first overvoltage protection unit or first suppression diode D1, is equipped to protect the disconnecting switch device TS, in particular its disconnecting switches T1, T2, and the circuit components, in particular the safety-relevant electrical devices L3 in the third electrical system branch BZ3, from (transient) overvoltages in the third electrical system branch BZ3.

The disconnecting switch device TS or at least its monitoring unit UE and control unit SE is/are for example part of a primary vehicle electrical system monitoring and control apparatus.

Since the topology of the disconnecting switch device TS has now been described in detail based on FIG. 1, its function will be described in greater detail below.

As with many safety-relevant devices, providing a redundant and mutually independent power supply to various actuators and controllers becomes increasingly important in an electrically drivable, partially or fully automated motor vehicle. This is largely driven by the introduction of new safety-relevant vehicle functions such as an x-by-wire control or more specifically, partially or fully automated driving. In order to achieve a redundancy in the power supply, the vehicle electrical system BN is embodied in "dual" fashion as described above, with two electrical system branches that are partially redundant relative to each other, namely the second and third electrical system branches BZ2, BZ3. The expression "partially redundant relative to each other" means that the two electrical system branches BZ2, BZ3 that are redundant relative to each other supply power to the same safety-relevant electrical devices L3 independently of each other and redundantly to each other, but also supply power separately from each other to different electrical devices L2 associated with the respective electrical system branches BZ2, BZ3.

The distribution of the vehicle electrical system BN in two electrical system branches BZ2, BZ3 that are redundant relative to each other is significantly simpler and more economical than a dual vehicle electrical system design with two vehicle electrical systems that are in particular galvanically isolated from each other. In addition, in the event of a malfunction in one of the two electrical system branches BZ2, BZ3, the vehicle electrical system BN with the electrical system branches BZ2, BZ3 that are redundant relative to each other functions more reliably than a dual vehicle electrical system design.

In this case, the above-described disconnecting switch device TS makes sure that in the event of a malfunction in one of the electrical system branches BZ2, BZ3, the power supply for performing safety-relevant functions, for example the x-by-wire control, continues to be reliably maintained.

But in order to insure a reliable power supply, particularly for the safety-relevant functions, and to avoid consequential damage in the event of a malfunction in one of the electrical system branches BZ2, BZ3, the malfunction in one of the electrical system branches BZ2, BZ3 must be rapidly detected at all times, in particular immediately after its onset, and countermeasures must be taken in order to avoid the resulting consequential damage.

A safer operating state of the disconnecting switch device TS outside of the specifications or more precisely, a departure from a safe operating area of the disconnecting switch device TS, in particular of the first disconnecting switch T1, must be avoided at all times, particularly in an idle mode of the vehicle electrical system BN. If a departure from the safe operating area occurs, then the disconnecting switch device TS, in particular the first disconnecting switch T1, can no longer be operated safely.

In an error-free operating mode of the vehicle electrical system BN in which the vehicle is in a driving mode, the diagnosis of malfunctions in the electrical system branches BZ2, BZ3 can generally be performed by the above-mentioned primary vehicle electrical system monitoring and control apparatus, which is supplied with a sufficient operating current by at least one of the two electrical system branches BZ2, BZ3. When malfunctions are detected, the primary apparatus also initiates countermeasures to avoid consequential damage.

In an idle mode of the vehicle electrical system BN in which the vehicle is parked and is therefore not in driving mode, the primary apparatus is not supplied with a sufficient operating current, generally at most 100 μA of current, which is required in order to perform a reliable diagnosis of malfunctions in the electrical system branches BZ2, BZ3 and to initiate countermeasures to avoid consequential damage.

In this case, the above-described disconnecting switch device TS takes the place of the primary apparatus and when malfunctions occur in the electrical system branches BZ2, BZ3, autonomously activates suitable countermeasures with its functionality described below and thus prevents consequential damage to the disconnecting switch device TS, in particular to the safety-relevant first disconnecting switch T1. The ability to diagnose an error-free functionality of the disconnecting switch device TS at all times is crucial since it is a link between the two electrical system branches BZ2, BZ3. In particular, the ability to diagnose a malfunction in the disconnecting switch device TS must also be ensured in the phase of the idle mode of the vehicle electrical system BN.

Generally, malfunctions in the electrical system branches BZ2, BZ3 result in overcurrents, in particular short-circuit currents, and/or overvoltages in the electrical system branches BZ2, BZ3 or are accompanied by overcurrents and/or overvoltages. The overcurrents or overvoltages in turn lead to consequential damage in the electrical devices, particularly the safety-relevant ones, in the electrical system branches BZ2, BZ3.

During an idle mode, the disconnecting switch device TS protects the vehicle electrical system BN from (further) consequential damage that can be caused by an overcurrent or a short-circuit current in one of the electrical system branches BZ2, BZ3.

To accomplish this, the moment the vehicle electrical system BN transitions from an operating mode into the idle mode, the disconnecting switch device TS uses the system control unit SE to switch the first disconnecting switch T1 into an open, current-disconnecting switching state and keeps the first disconnecting switch T1 in this current-disconnecting switching state throughout the entire phase of the idle mode. At the same time, the disconnecting switch device TS uses the control unit SE to switch the second disconnecting switch T2 of the series circuit SS into a closed, current-carrying switching state and keeps the second disconnecting switch T2 in this current-carrying switching state throughout the entire phase of the idle mode. As a result, in the idle mode of the vehicle electrical system BN, a current transmission path between the two electrical system branches BZ2, BZ3 is formed via the series circuit SS and via the melting fuse S of the overcurrent protection unit.

If as a result of a malfunction in one of the two electrical system branches BZ2, BZ3, for example in the second electrical system branch BZ2, a short-circuit current (or overcurrent) occurs, then this current "tries" to flow from the one or second electrical system branch BZ2 into the other or third electrical system branch BZ3 via the series circuit SS. If in this case, the amperage of the short-circuit current exceeds a predetermined value for a predetermined time, then the melting fuse S of the overcurrent protection unit of the series circuit SS melts and the flow of the short-circuit current from the second electrical system branch BZ2 into the third electrical system branch BZ3 is interrupted. The third electrical system branch BZ3 is thus protected from damage due to the short-circuit current from the second electrical system branch BZ2. In this case, the melting fuse S is selected so that it melts before the short-circuit current from one of the two electrical system branches BZ2, BZ3 spreads to the respective other electrical system branch BZ3, BZ2 through the melting fuse S and also causes damage in this other electrical system branch BZ3, BZ2, particularly to the safety-relevant electrical devices in this other electrical system branch BZ3, BZ2.

The interruption of the current flow in the series circuit SS due to the melting of the melting fuse S during the idle mode will occur no later than at the transition to a subsequent one.

At the transition from the idle mode into the operating mode, the disconnecting switch device TS uses the monitoring unit UE in a way known to the person skilled in the art to detect the fact that the melting fuse S has melted during the idle mode, for example by measuring a voltage that drops through the melting fuse S, and therefore detects that an overcurrent was flowing or a short circuit was present in one of the two electrical system branches BZ2, BZ3 during the idle mode.

Correspondingly, the monitoring unit UE detects the fact that the disconnecting switch device TS, in particular the second disconnecting switch T2, may possibly (and at least temporarily) have departed from its safe operating area or is even (permanently) damaged, and therefore is no longer able to ensure a safe operation of the vehicle electrical system BN in the subsequent operating mode. In this case, the disconnecting switch device TS uses the monitoring unit UE to prompt the control unit SE to switch both the first disconnecting switch T1 and the second disconnecting switch T2 into the open, current-disconnecting switching state and to keep them in this current-disconnecting switching state. In this way, the disconnecting switch device TS prevents a possibly dangerous current connection from being produced between the two electrical system branches BZ2, BZ3 after the occurrence of a short circuit in one of the two electrical system branches BZ2, BZ3 during the idle mode. The disconnecting switch device TS thus prevents a starting of the vehicle electrical system BZ and/or of the vehicle after the occurrence of a short circuit during the idle mode. In addition, the disconnecting switch device TS uses the monitoring unit UE to output a warning signal, which indicates the need to visit a service station.

If the melting fuse S has melted during the idle mode and has thus interrupted the current flow via the series circuit SS, then it is detected that the disconnecting switch device TS or more precisely the first and second disconnecting switch T1, T2 may possibly have at least temporarily departed from the safe operating area. In this case, the possibility of a damage to the disconnecting switch device TS or more precisely to the two disconnecting switches T1, T2 can no longer be ruled out. At the transition from the idle mode into the operating mode, this incident is reported to the primary vehicle electrical system monitoring and control apparatus, which in turn prompts that an activation of safety-relevant vehicle functions such as an automated driving is prevented and a safer vehicle state is initiated, for example a shutdown of the vehicle.

If the melting fuse S has not melted during the idle mode, then the disconnecting switch device TS or the monitoring unit UE operates on the assumption that both the disconnecting switch device TS and the two electrical system branches BZ2, BZ3 are intact. In this case, at the transition from the idle mode into the operating mode, the monitoring unit UE prompts the control unit SE to switch the first disconnecting switch T1 into the closed, current-carrying switching state and at the same time to switch the second disconnecting switch T2 into the open, current-disconnecting switching state. As a result, the disconnecting switch device TS produces an unhindered current flow between the two electrical system branches BZ2, BZ3 during the operating mode.

The disconnecting switch device TS also protects the vehicle electrical system BN during the idle mode (but also during the operating mode) from (further) consequential damage that can be caused by overvoltages in the electrical system branches BZ2, BZ3.

First of all, this occurs in a simple way due to the fact that the disconnecting switch device TS protects itself from the damage caused by the overvoltages in the electrical system branches BZ2, BZ3. In this case, the protection is provided with the aid of the two overvoltage protection units with their respective suppression diodes D1, D2. The voltage levels of the two suppression diodes D1, D2 are selected so that their breakdown voltages each lie below a critical voltage level that can damage the disconnecting switch device TS and in particular its two disconnecting switches T1, T2.

When (transient) overvoltage spikes, which are higher than the breakdown voltages of the respective suppression diodes D1, D2 and thus higher than the critical voltage of the disconnecting switch device TS, occur in the respective electrical system branches BZ2, BZ3, the two suppression diodes D1, D2 discharge these spikes via electrical ground GND and thus protect the disconnecting switch device TS or more precisely the two disconnecting switches T1, T2 of the disconnecting switch device TS from malfunction or damage due to the overvoltage spikes. As a result, the two overvoltage protection units with their respective suppression diodes D1, D2 primarily insure that the (transient) overvoltage spikes do not cause the disconnecting switch device TS or more precisely its two disconnecting switches T1, T2 to needlessly depart from their safe operating area and thus lose their protective function.

Preferably, the breakdown voltages of the two suppression diodes D1, D2 are also selected to be low enough that in addition, the circuit components in the two electrical system branches BZ2, BZ3, particularly the safety-relevant electrical devices, are not damaged by the (transient) overvoltage spikes.

Since the two suppression diodes D1, D2 do not require any supply current for their protective function, they can effectively protect the disconnecting switch device TS and the vehicle electrical system BN from the (transient) overvoltage spikes even in the idle mode. When the respective breakdown voltages are reached, the suppression diodes D1, D2 simply become conductive and thus limit the (transient) overvoltage spikes to the voltage level that is safe for both the disconnecting switch device TS and the vehicle electrical system BN.

The disconnecting switch device TS therefore makes it possible to perform a reliable diagnosis of possible damage to the disconnecting switch device TS, in particular to the first disconnecting switch TS1, during the idle mode of the vehicle or of the vehicle electrical system BZ. In this case, the possible damage during the transition from the idle mode into the subsequent operating mode or during a subsequent starting of the vehicle is detected by the disconnecting switch device TS and is reported, for example, to the primary vehicle electrical system monitoring and control apparatus, which then initiates suitable measures to protect the vehicle electrical system BN. In this case, the disconnecting switch device TS in the idle mode consumes an idle current of less than 100 µA.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

The invention claimed is:

1. A vehicle electrical system (BZ), comprising:
at least two electrical system branches (BZ2, BZ3) electrically connected to each other via a positive voltage-side current path (SP) and each having at least one electrical device (L2, L3); a disconnecting switch device (TS) electrically connected in the current path (SP) between the two electrical system branches (BZ2, BZ3) and, in the event of a critical state in one of the two electrical system branches (BZ2, BZ3) being equipped to interrupt a current flow via the current path (SP); the disconnecting switch device (TS) has a first controllable switch unit (T1) and a series circuit (SS) including a second controllable switch unit (T2) and an overcurrent protection unit (S), the first switch unit and the series circuit electrically connected to each other in parallel in the current path (SP) between the two electrical system branches (BZ2, BZ3); the disconnecting switch device (TS) having a control unit (SE) for actuating the disconnecting switch device (TS), which is connected in a signal-carrying way on its control signal output side to the first switch unit (T1) and the second switch unit (T2) and in an idle mode of the vehicle electrical system (BZ) being equipped to switch the first switch unit (T1) into an open, current-disconnecting switching state and to switch the second switch unit (T2) into a closed, current-carrying switching state; and in the idle mode and in the event of an overcurrent in the series circuit (SS), the overcurrent protection unit (S) equipped to interrupt the current flow via the series circuit (SS).

2. The vehicle electrical system (BZ) according to claim 1, wherein in an operating mode of the vehicle electrical system (BZ), the control unit is equipped to switch the first switch unit (T1) into a current-carrying switching state and to switch the second switch unit (T2) into a current-disconnecting switching state.

3. The vehicle electrical system (BZ) according to claim 2, wherein the disconnecting switch device (TS) also has a monitoring unit (UE), which is connected in a signal-carrying way on its signal output side to a signal input of the control unit (SE), and is equipped to monitor a state of the overcurrent protection unit (S) and, in the event that the overcurrent protection unit (S) loses its protective function, prompting the control unit (SE) by outputting a state-warning signal to keep the first switch unit (T1) in the open current-disconnecting switching state in a transition from the idle mode into the operating mode.

4. The vehicle electrical system (BZ) according to claim 3, wherein the overcurrent protection unit (S) has a melting fuse or a pyrotechnic fuse.

5. The vehicle electrical system (BZ) according to claim 3, wherein the overcurrent protection unit (S) has a conductor path with a tapered segment, which is a part of the current connection of the series circuit (SS) and is formed so that it melts in the event of an overcurrent in the series circuit (SS) and thus interrupts the current connection via the series circuit (SS).

6. The vehicle electrical system (BZ) according to claim 5, wherein the first (T1) and/or the second switch unit (T2) each has a disconnecting switch or a semiconductor disconnecting switch or a MOSFET disconnecting switch.

7. The vehicle electrical system (BZ) according to claim 6, wherein the disconnecting switch device (TS) has a first overvoltage protection unit (D1), which is electrically connected between a first current connection point (P1) which lies on the current path (SP) and between a first of the two electrical system branches (BZ2) and the disconnecting switch device (TS) and an electrical ground (GND) and is equipped to protect the disconnecting switch device (TS) from overvoltages in the first electrical system branch (BZ2); and/or the disconnecting switch device (TS) also has a second overvoltage protection unit (D2), which is electrically connected between a second current connection point (P2) which lies on the current path (SP) and between a second of the two electrical system branches (BZ3) and the disconnecting switch device (TS) and the electrical ground (GND) and is equipped to protect the disconnecting switch device (TS) from overvoltages in the second electrical system branch (BZ3).

8. The vehicle electrical system (BZ) according to claim 7, wherein the first overvoltage protection unit (D1) has a first unidirectional suppression diode, which is electrically connected between the first current connection point (P1) and the ground (GND), wherein the reverse direction of the first suppression diode points from the first current connection point (P1) to the ground (GND); and/or the second overvoltage protection unit (D2) has a second unidirectional suppression diode, which is electrically connected between the second current connection point (P2) and the ground (GND), wherein the reverse direction of the second suppression diode points from the second current connection point (P2) to the ground (GND).

9. The vehicle electrical system (BZ) according to claim 8, wherein the first and/or the second suppression diode each has a respective breakdown voltage, which lies below a critical voltage that can lead to a malfunction in the disconnecting switch device (TS).

10. The vehicle electrical system (BZ) according to claim 7, wherein the first (D1) and/or the second (D2) overvoltage protection unit each has a respective clamping circuit.

11. A motor vehicle or an electrically driven motor vehicle that has a vehicle electrical system (BZ) according to claim 10.

12. The vehicle electrical system (BZ) according to claim 1, wherein the disconnecting switch device (TS) also has a monitoring unit (UE), which is connected in a signal-carrying way on its signal output side to a signal input of the control unit (SE), and is equipped to monitor a state of the overcurrent protection unit (S) and, in the event that the overcurrent protection unit (S) loses its protective function, prompting the control unit (SE) by outputting a state-warning signal to keep the first switch unit (T1) in the open current-disconnecting switching state in a transition from the idle mode into the operating mode.

13. The vehicle electrical system (BZ) according to claim 1, wherein the overcurrent protection unit (S) has a melting fuse or a pyrotechnic fuse.

14. The vehicle electrical system (BZ) according to claim 1, wherein the overcurrent protection unit (S) has a conductor path with a tapered segment, which is a part of the current connection of the series circuit (SS) and is formed so that it melts in the event of an overcurrent in the series circuit (SS) and thus interrupts the current connection via the series circuit (SS).

15. The vehicle electrical system (BZ) according to claim 1, wherein the first (T1) and/or the second switch unit (T2) each has a disconnecting switch or a semiconductor disconnecting switch or a MOSFET disconnecting switch.

16. The vehicle electrical system (BZ) according to claim 1, wherein the disconnecting switch device (TS) has a first overvoltage protection unit (D1), which is electrically connected between a first current connection point (P1) which lies on the current path (SP) and between a first of the two electrical system branches (BZ2) and the disconnecting switch device (TS) and an electrical ground (GND) and is equipped to protect the disconnecting switch device (TS) from overvoltages in the first electrical system branch (BZ2); and/or the disconnecting switch device (TS) also has a second overvoltage protection unit (D2), which is electrically connected between a second current connection point (P2) which lies on the current path (SP) and between a second of the two electrical system branches (BZ3) and the disconnecting switch device (TS) and the electrical ground (GND) and is equipped to protect the disconnecting switch device (TS) from overvoltages in the second electrical system branch (BZ3).

17. The vehicle electrical system (BZ) according to claim 7, wherein the first overvoltage protection unit (D1) has a first unidirectional suppression diode, which is electrically connected between the first current connection point (P1) and the ground (GND), wherein the reverse direction of the first suppression diode points from the first current connection point (P1) to the ground (GND); and/or the second overvoltage protection unit (D2) has a second unidirectional suppression diode, which is electrically connected between the second current connection point (P2) and the ground (GND), wherein the reverse direction of the second suppression diode points from the second current connection point (P2) to the ground (GND).

18. The vehicle electrical system (BZ) according to claim 8, wherein the first and/or the second suppression diode each has a respective breakdown voltage, which lies below a critical voltage that can lead to a malfunction in the disconnecting switch device (TS).

19. The vehicle electrical system (BZ) according to claim 7, wherein the first (D1) and/or the second (D2) overvoltage protection unit each has a respective clamping circuit.

20. A motor vehicle or an electrically driven motor vehicle that has a vehicle electrical system (BZ) according to claim 1.

\* \* \* \* \*